(12) United States Patent  
Sullivan et al.

(10) Patent No.: US 11,629,839 B2  
(45) Date of Patent: Apr. 18, 2023

(54) HYBRID LAMP FOR A VEHICLE

(71) Applicant: Flex-N-Gate Advanced Product Development, LLC, Tecumeseh (CA)

(72) Inventors: Lester Ray Sullivan, Wyoming, MI (US); Ronie George, Kentwood, MI (US)

(73) Assignee: Flex-N-Gate Advanced Product Development, LLC, Tecumseh (CA)

( * ) Notice: Subject to any disclaimer, the term of this patent is extended or adjusted under 35 U.S.C. 154(b) by 0 days.

(21) Appl. No.: 17/212,671

(22) Filed: Mar. 25, 2021

(65) Prior Publication Data

US 2021/0302000 A1 Sep. 30, 2021

Related U.S. Application Data

(60) Provisional application No. 62/994,524, filed on Mar. 25, 2020.

(51) Int. Cl.
*F21S 43/20* (2018.01)
*F21S 43/40* (2018.01)
(Continued)

(52) U.S. Cl.
CPC ............ *F21S 43/26* (2018.01); *B60Q 1/30* (2013.01); *B60Q 1/34* (2013.01); *F21S 43/14* (2018.01); *F21S 43/15* (2018.01); *F21S 43/40* (2018.01); *F21S 43/50* (2018.01); *F21V 5/004* (2013.01); *F21V 5/007* (2013.01); *F21V 23/003* (2013.01);
(Continued)

(58) Field of Classification Search
CPC ...... B60Q 1/0023; B60Q 1/2607; B60Q 1/30;
B60Q 1/34; B60Q 2400/00–50; F21S 43/14–15; F21S 43/26; F21S 43/40–50; F21V 5/004–007; F21V 23/003;
(Continued)

(56) References Cited

U.S. PATENT DOCUMENTS 4,868,719 A 9/1989 Kouchi et al.
5,939,979 A 8/1999 Lee
(Continued)

FOREIGN PATENT DOCUMENTS

CN 203431672 U 2/2014
KR 20160091867 A 8/2016
WO 9930925 A1 6/1999

OTHER PUBLICATIONS

International Search Report and Written Opinion dated Jul. 1, 2021 International Application No. PCT/US2020/024041; International Filing Date: Mar. 25, 2021; Applicant: Flex-N-Gate Advanced Product Development, LLC.

*Primary Examiner* — Jason M Han
(74) *Attorney, Agent, or Firm* — Avek IP, LLC (57) ABSTRACT

A hybrid vehicle lamp includes a functional surface and a functional marking integrated within the functional surface. A housing has a plurality of mounting locations configured to respectively align a plurality of light sources configured to illuminate the functional marking or the functional surface, or both, in a lit mode. A controller is configured to individually control each of the plurality of light sources for providing different illumination patterns of the functional marking and the functional surface such that such that automotive functional lighting and non-automotive functional lighting is provided.

19 Claims, 6 Drawing Sheets

(51) Int. Cl.
  *F21S 43/14* (2018.01)
  *F21V 23/00* (2015.01)
  *F21S 43/15* (2018.01)
  *F21V 5/00* (2018.01)
  *F21S 43/50* (2018.01)
  *B60Q 1/34* (2006.01)
  *B60Q 1/30* (2006.01)
  *F21Y 103/10* (2016.01)
  *F21Y 115/10* (2016.01)

(52) U.S. Cl.
  CPC ....... *B60Q 2400/20* (2013.01); *F21Y 2103/10* (2016.08); *F21Y 2115/10* (2016.08)

(58) Field of Classification Search
  CPC ........... F21W 2103/00; F21W 2104/00; F21Y 2103/10; F21Y 2115/10
  See application file for complete search history.

(56) References Cited

U.S. PATENT DOCUMENTS

| | | | |
|---|---|---|---|
| 6,404,334 | B1 | 6/2002 | Chao |
| 8,363,180 | B2* | 1/2013 | Matsui ................. G09G 3/3648 |
| | | | 349/61 |
| 8,992,057 | B2 | 3/2015 | Foley et al. |
| 9,030,124 | B2 | 5/2015 | Schoel et al. |
| 9,210,771 | B2* | 12/2015 | Day ........................ B60Q 1/34 |
| 9,221,342 | B2 | 12/2015 | Dehmann |
| 2003/0179088 | A1 | 9/2003 | Heller |
| 2006/0061139 | A1 | 3/2006 | Mochizuki |
| 2013/0006775 | A1 | 1/2013 | Jordan et al. |
| 2016/0231471 | A1* | 8/2016 | Ma ....................... G02B 3/0037 |
| 2017/0061841 | A1 | 3/2017 | Safavi et al. |
| 2017/0305332 | A1 | 10/2017 | Albou et al. |
| 2017/0305336 | A1 | 10/2017 | Parkes |
| 2019/0168663 | A1 | 6/2019 | Nykerk et al. |
| 2020/0101893 | A1 | 4/2020 | Studeny et al. |

* cited by examiner

HYBRID LAMP FOR A VEHICLE

CROSS-REFERENCE TO RELATED APPLICATIONS

This application claims the benefit of U.S. Provisional Application No. 62/994,524 entitled "Hybrid Lamp for a Vehicle" and filed on Mar. 25, 2020, which is herein incorporated by reference in its entirety.

BACKGROUND

1. Field of the Disclosure

Embodiments of this disclosure relate generally to the field of light assemblies for use in vehicles. More specifically, embodiments of this disclosure include hybrid taillight assemblies with multiple functions.

2. Description of the Related Art

Many different types of lighting assemblies for use on the exterior of a vehicle have been described in the prior art. For example, U.S. Pat. No. 9,221,342 to Dehmann discloses an apparatus and method for displaying graphical content in different modes based on vehicle speed. International Patent Application Publication WO 99/30925 to Venturi discloses an extra braking light for a vehicle with enhanced functions such as providing warnings and advertisements. U.S. Pat. No. 10,399,484 to Parkes and U.S. Patent Application Publication 2013/0006775 to Jordan et al. both disclose a display system for rendering content on an exterior of a vehicle. U.S. Pat. No. 8,992,057 to Foley discloses an expressive lighting system disposed within a cavity of a main lighting assembly. U.S. Patent Application Publication No. 2020/0101893 to Studeny discloses an individualizable lighting system for a vehicle that is integrated within a main vehicle lighting system housing. U.S. Patent Application Publication No. 2003/0179088 to Heller discloses an illuminated logo disposed on a rear high-mounted brake light.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages will be apparent from the following detailed description of the embodiments and the accompanying drawing figures.

In an embodiment, a hybrid lamp for a vehicle includes a functional surface, a functional marking integrated within the functional surface, a plurality of light sources configured to illuminate the functional marking and the functional surface, a housing adapted to structurally support the plurality of light sources and the functional surface, and a controller configured to individually control each of the plurality of light sources for providing different illumination patterns of the functional marking and the functional surface such that automotive functional lighting and non-automotive functional lighting is provided.

In another embodiment, a hybrid vehicle lamp includes an opaque-metalized surface having a transparent marking. The transparent marking is integrated within the same piece of material as the opaque-metalized surface. A plurality of light sources are configured to illuminate the transparent marking and the opaque-metalized surface. A housing has a plurality of mounting locations configured to align the plurality of light sources for illumination of the opaque-metalized surface and the transparent marking in a lit mode. A controller is configured to individually control each of the plurality of light sources for providing different illumination patterns of the transparent marking and the opaque-metalized surface such that at least one automotive lighting function is provided. The opaque-metalized surface and the transparent marking are configured such that the transparent marking illuminates differently than the opaque-metalized surface, thereby accentuating visibility of the transparent marking to provide a decorative function.

BRIEF DESCRIPTION OF THE DRAWINGS

Illustrative embodiments of the present disclosure are described in detail below with reference to the attached drawing figures, which are incorporated by reference herein and wherein.

The drawing figures do not limit the invention to the specific embodiments disclosed and described herein. The drawings are not necessarily to scale, emphasis instead being placed upon clearly illustrating the principles of the disclosure.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

In certain lighting applications, markings may be incorporated into a light assembly for producing a desired visual effect. Some examples of markings include logos, designs, emblems, geometric shapes, graphics, text, coded message, etc. Typically, an exterior vehicle display light having markings is separate and independent from a conventional vehicle light assembly that provides one or more automotive functions (e.g., tail-light, stop signal, turn signal).

Embodiments of the present disclosure provide a hybrid light for a vehicle having an illuminated marking integrated with a conventional automotive vehicle lamp in such a way that the illuminated marking contributes to the automotive functionality of the vehicle lamp. In other words, the hybrid lights disclosed herein operate to provide both a conventional automotive lighting function and a decorative lighting function for use on vehicle exteriors.

Integration of markings with vehicle lights is complicated by photometric requirements of particular vehicle lights. For example, vehicle brake lights must provide a specific total illumination surface area and illumination intensity. Embodiments of the present disclosure may be used to provide multiple functions from the same device, including automotive functions such as a tail-light, stop signal, and turn signal, as well as illuminated markings used to provide messaging and/or custom styling.

Figure 1:
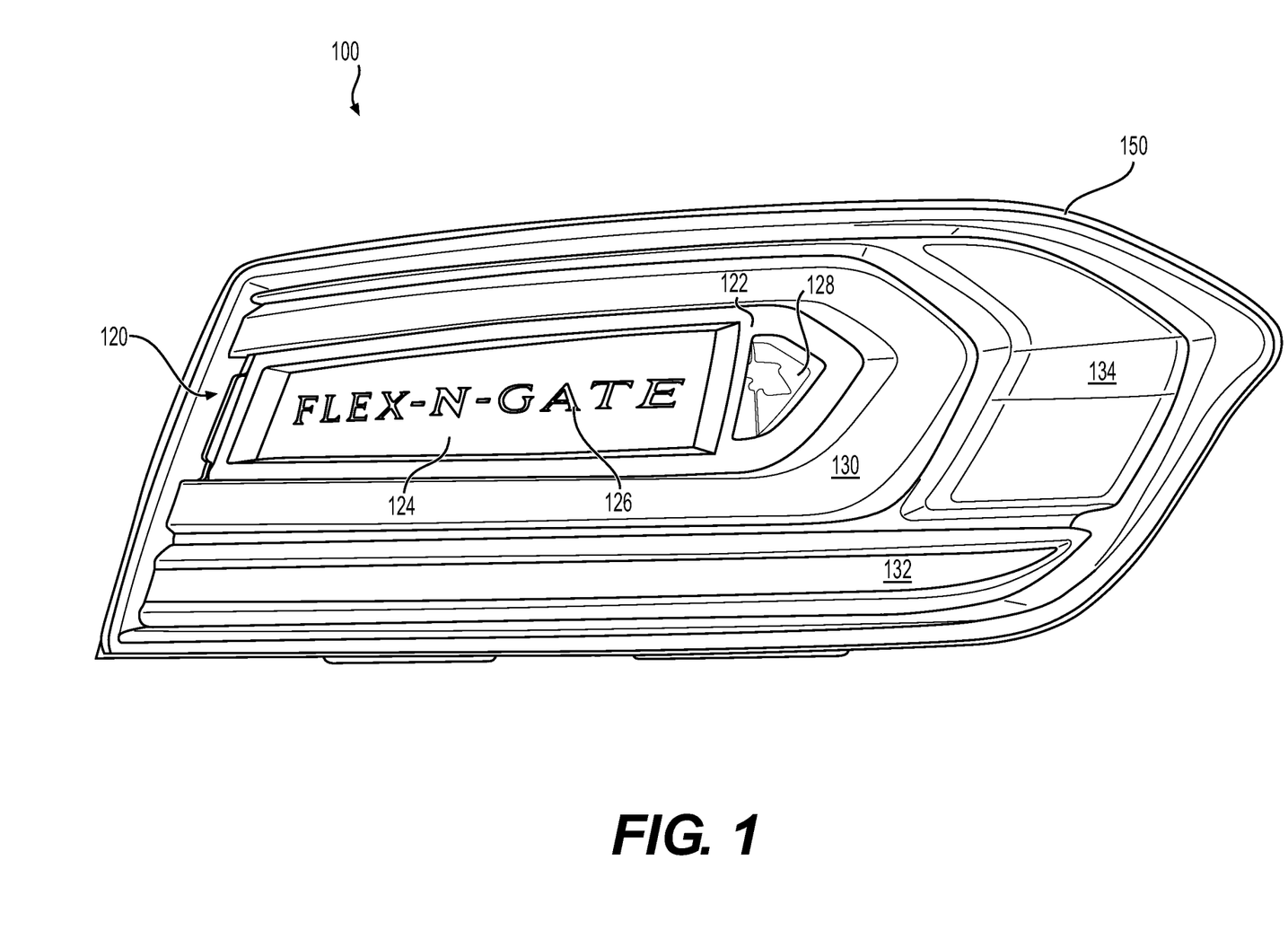
FIG. 1 is a front view of a hybrid lamp integrated in a vehicle lamp assembly, in an embodiment.
Figure 2:
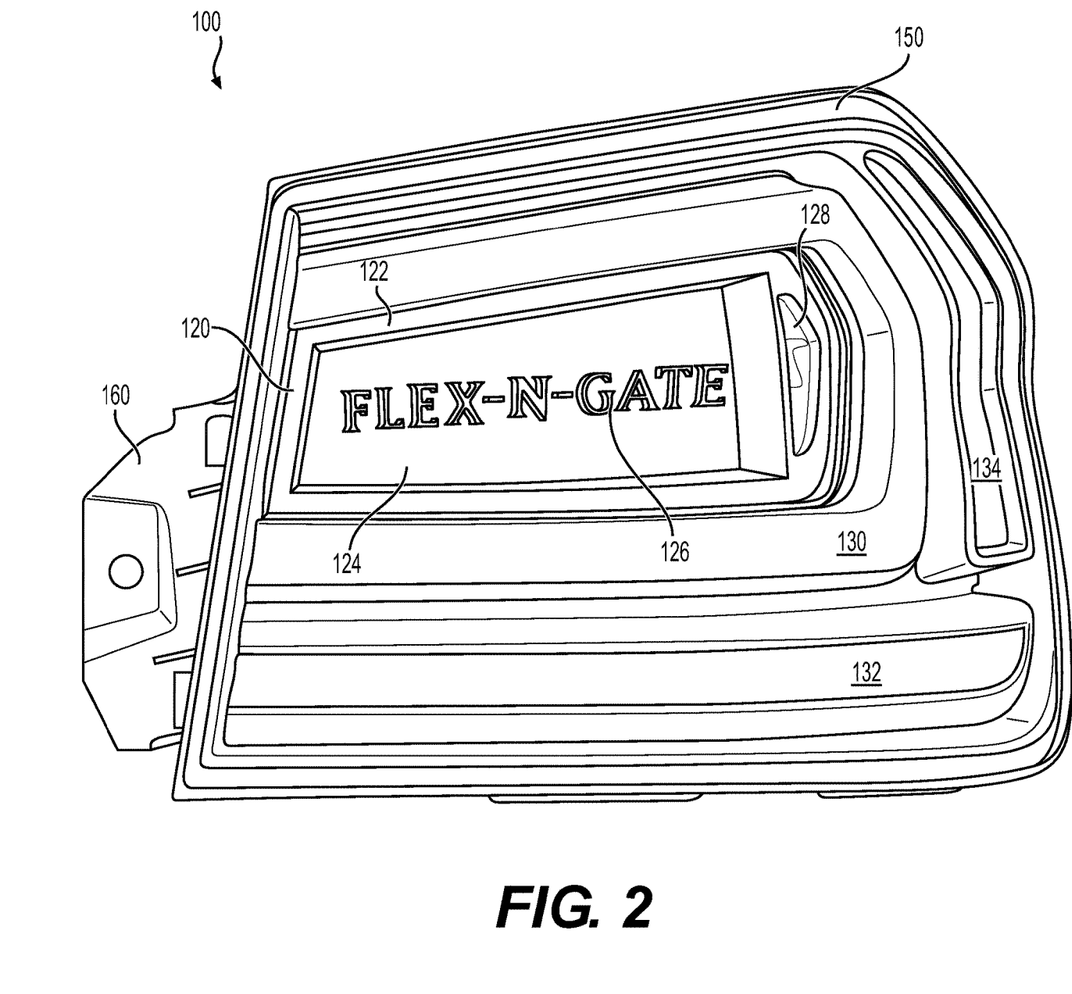
FIG. 2 is a perspective view of the hybrid lamp integrated in the vehicle lamp assembly of FIG. 1.

FIG. 1 is a front view of an exemplary hybrid lamp 120 integrated in a vehicle lamp assembly 100. FIG. 2 is a perspective view of hybrid lamp 120 integrated in vehicle lamp assembly 100. FIGS. 1 and 2 are best viewed together with the following description. Vehicle lamp assembly 100 is an exemplary working environment of hybrid lamp 120. A lamp assembly housing 150 includes components for structurally supporting hybrid lamp 120 and for mounting vehicle lamp assembly 100 to a vehicle, including for example a bracket 160 shown in FIG. 2. Lamp assembly housing 150 is designed to be in body position of a vehicle and to follow studio styling curves that accentuate the lamp and add value to branding and aesthetics of the vehicle. Additional lighting areas 130, 132, and 134 within lamp assembly housing 150 may be configured to accommodate additional functional elements (e.g., turn signals, stop lights, reverse lights, reflectors, sensors, etc.). Exemplary sensors that may be located in one or more of areas 130, 132, 134 include blind spot detection sensors, LIDAR based detection systems, cameras, photodetectors, light sensors, etc.

Figure 3:
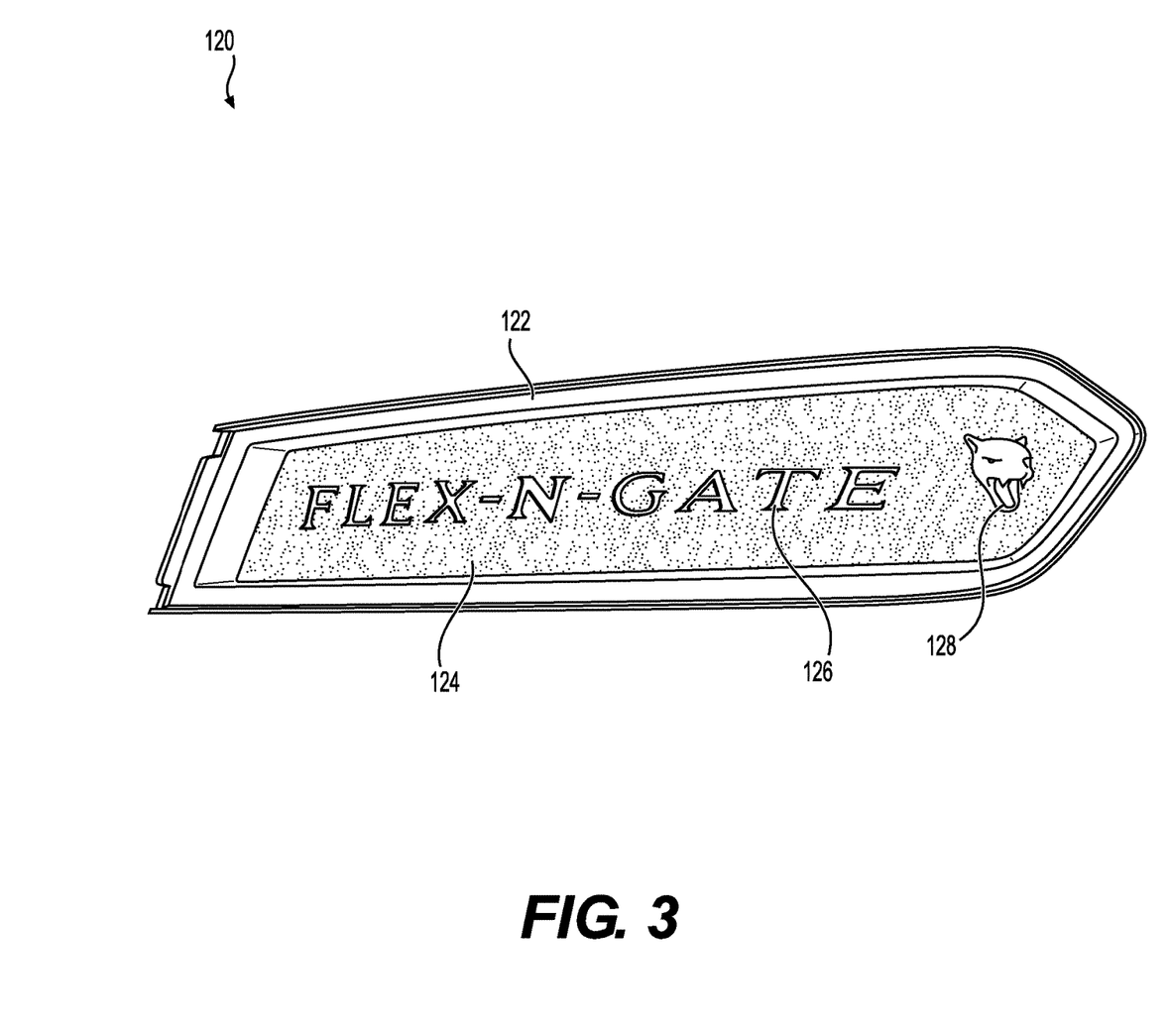
FIG. 3 is a front view of the hybrid lamp of FIG. 1.
Figure 4:
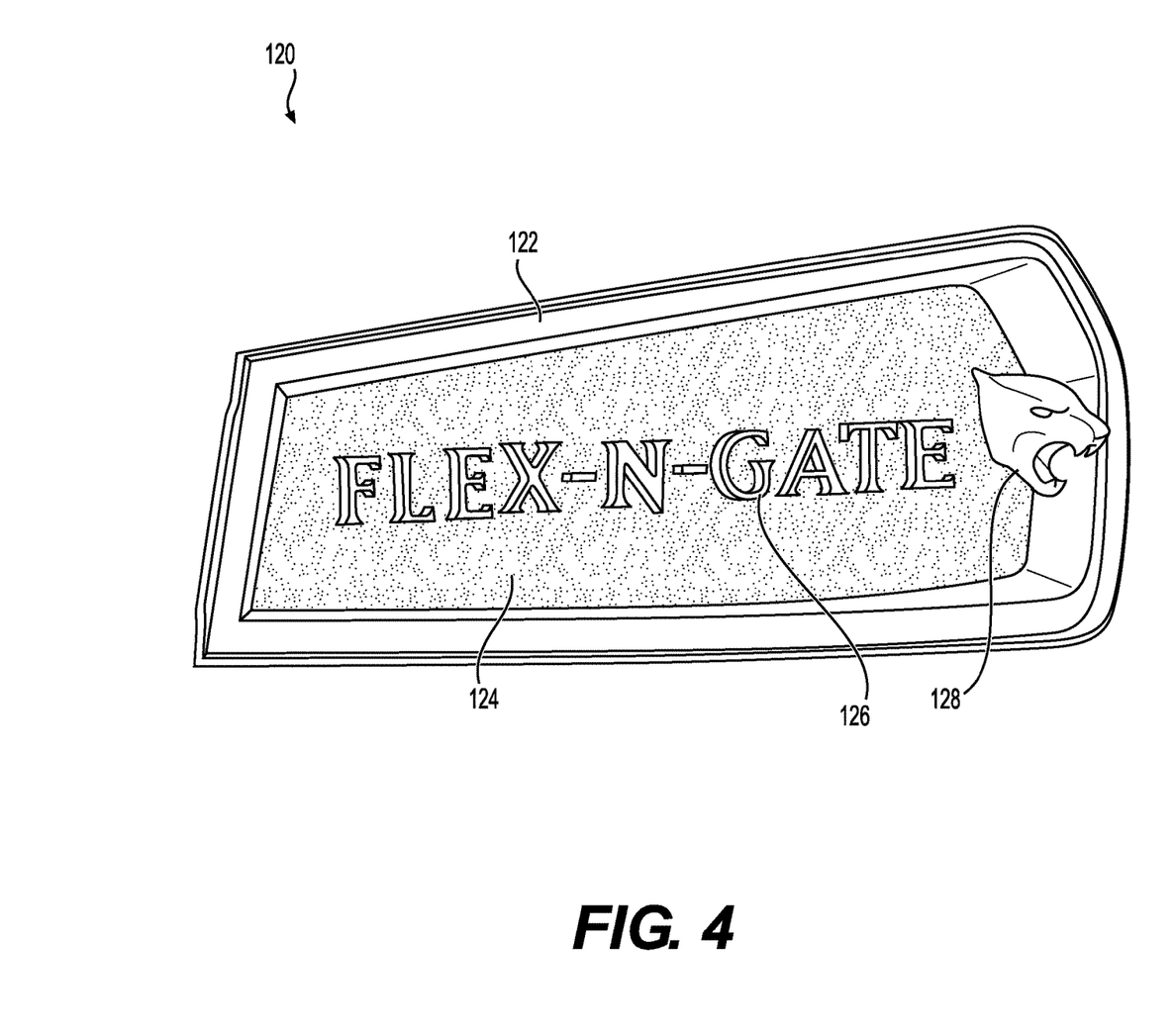
FIG. 4 is a perspective view of the hybrid lamp of FIG. 1.

FIG. 3 is a front view of hybrid lamp 120. FIG. 4 is a perspective view of hybrid lamp 120. FIGS. 3 and 4 are best viewed together with the following description. Hybrid lamp 120 includes a lamp housing 122, a functional surface 124, a first functional marking 126, and a second functional marking 128. As used herein, the term "functional" of functional surface 124, first functional marking 126, and second functional marking 128, is meant to broadly construe that the surface/marking provides a function of hybrid lamp 120. The function may include but is not limited to lighting, illumination, full or partial transparency, opaqueness, reflection, contrast enhancement, or any other desired alteration to the appearance of the surface/marking that contributes to the overall lighting effect of hybrid lamp 120, whether in a lit mode or in an unlit mode. In the lit mode, one or more light sources are turned on to illuminate some or all portions of hybrid lamp 120. In the unlit mode, the one or more light sources are turned off.

First and second functional markings 126, 128 depicted in the drawing figures are exemplary only. An individual marking or more than two markings may be included in hybrid lamp 120 without departing from the scope hereof. Functional markings 126, 128 may form any graphic element, such as the graphic elements depicted in FIGS. 3 and 4, or any other type of marking, including but limited to a logo, design, emblem, geometric shape, text, and/or coded message, etc. Without departing from the scope hereof, the same basic arrangement, including minor variations thereof, may be used to provide a hybrid lamp for other lighting applications in addition to external vehicle lighting.

Lamp housing 122 provides structural support for the functional surface 124, the first and second functional markings 126, 128, and one or more light sources. In the embodiments shown in FIGS. 3 and 4, the one or more light sources are positioned behind functional surface 124 to provide backlighting such that the functional markings 126, 128, and optionally functional surface 124, are backlit when the one or more light sources are illuminated. In the embodiment shown in FIG. 5, the light sources 151, 152, 153, 154, 155, and 156 are positioned above functional surface 124 to provide top lighting. In some embodiments, light sources are provided both above and behind functional surface 124 such that backlit and top-lit lighting functions are achievable. Other positioning of light sources is possible (e.g., bottom-lit), and other combinations of top-lit, backlit, and bottom-lit light sources are possible, without departing from the scope hereof.

Figure 5:
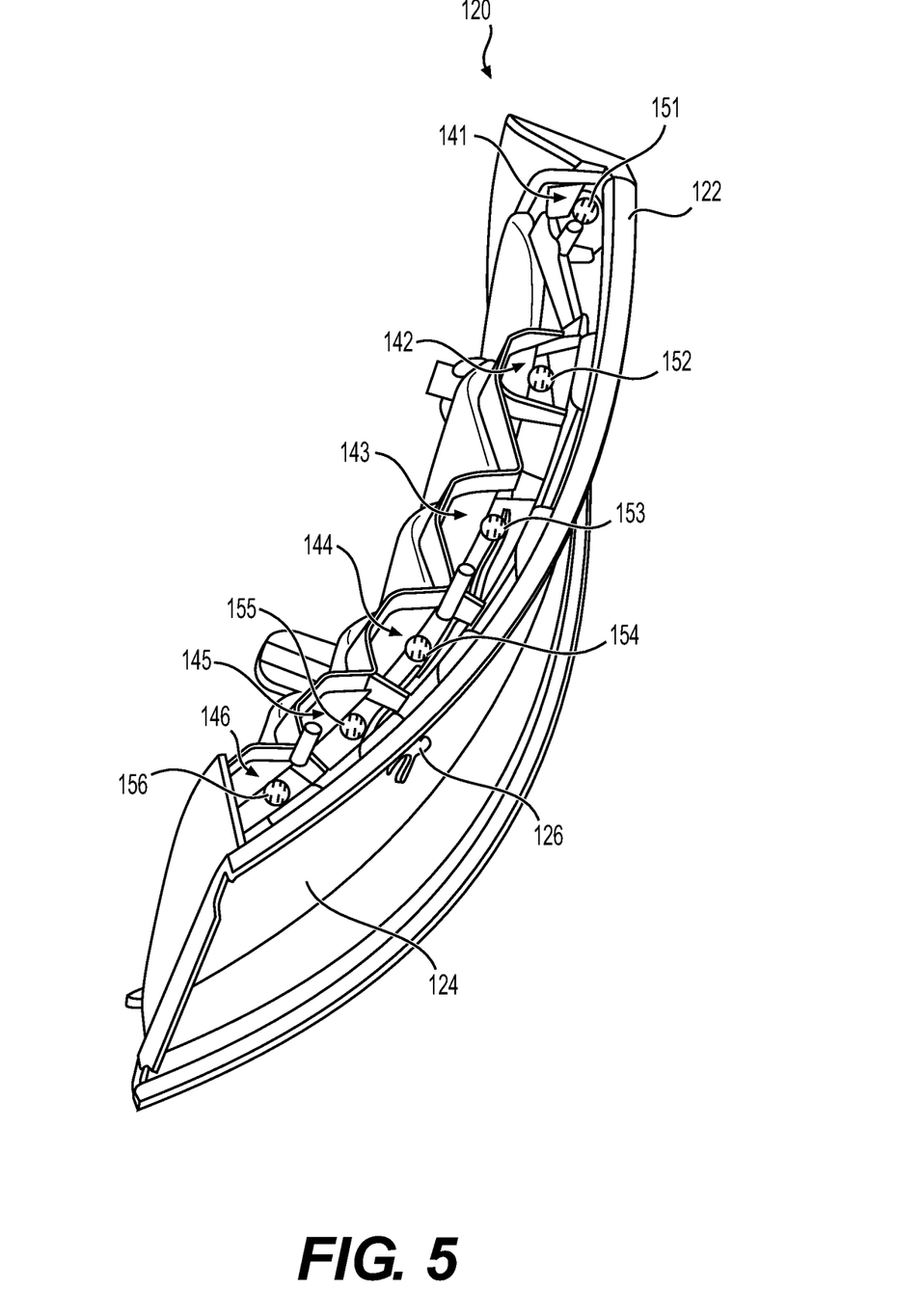
FIG. 5 is a top perspective view of the hybrid lamp of FIG. 1.

In embodiments, functional surface 124 is a reflective surface configured to catch light at certain angles (e.g., from a light source or from ambient light) and reflect the light at certain angles. In embodiments, the functional surface 124 provides prescription optics for directing reflected light from light sources 151-156. In some embodiments, the functional surface 124 includes a plurality of microlens surfaces. The plurality of microlens surfaces may be arranged in a textured pattern (e.g., microlens surfaces are patterned at different angles to create a textured appearance). In embodiments, hybrid lamp 120 illuminates a textured microlens surface of functional surface 124 via light sources 151-156. At least one of light sources 151-156 is configured to illuminate functional surface 124, and at least one of light sources 151-156 is configured to illuminate each of functional markings 126, 128. Light sources 151-156 may be positioned above or below the functional surface 124 to provide top-lighting or bottom-lighting, respectively. As depicted in FIG. 5, light sources 151-156 are positioned above functional surface 124 via mounting locations 141, 142, 143, 144, 145, and 146.

In certain embodiments, portions of hybrid lamp 120 may be treated to provide a metalized surface in which the outwardly facing surfaces are coated with a metallic coating. In some embodiments, one or more portions of hybrid lamp 120 are configured as an opaque-metalized portion to block light and to provide a crisp cutoff within the overall light pattern. For example, one or more of functional surface 124, first functional marking 126, or second functional marking 128 may be configured as an opaque-metalized portion. The opaque-metalized portion is for example a black metallized material in which a black plastic part (e.g., black polycarbonate) is formed by an injection molding process, followed by the part being coated with a metallic coating. Other portions that are not opaque-metalized may be clear metalized portions, in which a transparent plastic part (e.g., clear polycarbonate) is formed by an injection molding process, followed by the part being coated with a metallic coating.

Opaque-metalized portions and transparent-metalized portions may be formed as a single part with a two shot injection molding process (e.g., one shot with black plastic and one shot with clear plastic). In this manner, the first portion is still warm when the second shot is applied such that the two portions are bonded together. In embodiments, functional surface 124 is an opaque-metalized portion while functional markings 126, 128 are made of clear plastic to be substantially transparent for illumination by the one or more light sources when hybrid lamp 120 is operated in the lit mode.

In certain embodiments, first and second functional markings 126, 128 may include their own reflective surface for contributing to the lighting function of hybrid lamp 120, albeit with a different appearance compared to the functional surface 124. For example, functional markings 126, 128 may include micro optics, prescription optics, an optical treatment, a smooth or textured appearance, or some combination thereof. Functional markings 126, 128 are configured to catch light at certain angles and reflect the light at certain angles, in either a similar or different manner compared to functional surface 124. In embodiments, functional surface 124 and at least one of the functional markings 126, 128 is configured to reflect light in the unlit mode such that ambient light reflects off of functional surface 124 differently than the at least one functional marking to accentuate visibility of the at least one marking for providing a decorative function.

In certain embodiments, the functional markings are configured to provide a three-dimensional (3D) effect, either by physically projecting forward of functional surface 124, or alternatively by providing a 3D visual effect, or a combination of a physical and visual 3D effect. For example, as depicted in FIGS. 1 and 2, second functional marking 128 is a 3D subsurface marking in which a physical 3D object is formed (e.g., via laser ablation) within a transparent solid material (e.g., glass or plastic). When illuminated in the lit mode, the 3D subsurface marking is illuminated and provides an illuminated 3D appearance within the transparent solid material.

In another example, as depicted in FIGS. 1-4, first functional marking 126 physically projects outwardly in front of the functional surface 124. Similarly, as depicted in FIGS. 3 and 4, second functional marking 128 physically projects outwardly in front of the functional surface 124. When illuminated in the lit mode, the first and second functional markings 126, 128 provide an illuminated 3D appearance.

Alternatively, a 3D visual effect may be used to provide an optical projection that appears as if hovering in front of hybrid lamp 120. The 3D visual effect may be provided via a floating image generation technique, such as that described in U.S. Patent Application Publication No. 2020/0026091 to Nykerk, the disclosure of which is incorporated by reference herein. Alternatively, the 3D visual effect may be provided via an animated 3D image multiplier technique, such as that described in U.S. Pat. No. 10,753,579 to Nykerk et al., the disclosure of which is incorporated by reference herein. Other types of 3D markings may be used in hybrid lamp 120 without departing from the scope hereof.

In embodiments, functional markings 126, 128 are configured to produce a desired visual effect while also contributing to the automotive functionality of a vehicle light assembly (e.g., the photometric requirements of a tail-light). In certain embodiments, one or both of functional markings 126, 128 provide a messaging capability. For example, first functional marking 126 presents text to be read by a person or via automated means (e.g., using a camera and image analysis software). Alternatively, a coded message may be provided (e.g., via a QR code) to be scanned and decoded via automated means.

Functional markings 126, 128 may be embossed such that portions of the marking protrude slightly in front of functional surface 124. Alternatively, markings 126, 128 may be recessed or flush with respect to the functional surface 124.

In embodiments, the markings 126, 128 include some combination of embossed, recessed, and/or flush portions. For manufacturing, a mold of markings 126, 128 may be etched into a tool used to form the functional surface 124 such that one combined part includes an embossed/recessed marking on the surface 124. In other words, functional surface 124 and markings 126, 128 are integrated within the same piece of material and formed via a single step.

The manufacturing process is for example a thermoforming process or an injection molding process, and the preferred material is a plastic material. Exemplary plastic materials include but are not limited to polycarbonate (PC), polycarbonate-acrylonitrile butadiene styrene (PC-ABS), poly(methyl methacrylate) (PMMA), and olefin (e.g., thermoplastic polyolefin). The plastic material may be colored or clear, transparent or opaque, or partially transparent/opaque without departing from the scope hereof.

As described above, one portion of hybrid lamp 120 may be formed with a colored plastic (e.g., black) to be opaque, while another portion is formed with a clear plastic to be transparent, by using a two-shot injection molding process. In this manner, functional surface 124 may be configured to provide a stark contrast behind the markings 126, 128, whether illuminated by light sources in the lit mode or by ambient lighting in the unlit mode.

Portions of hybrid lamp 120 may be coated or treated to alter the appearance and/or transparency. For example, a metallized coating may be applied to functional surface 124, while functional markings 126, 128 may also be coated or masked to avoid being coated. In another example, optical coatings or anti-glare coatings may be applied to some or all portions of hybrid lamp 120.

FIG. 5 is a top perspective view of hybrid lamp 120 showing a plurality of mounting locations 141-146 for supporting a respective plurality of light sources 151-156. The mounting locations 141-146 are arranged above the functional surface 124 and functional markings 126, 128. In the embodiment depicted in FIG. 5, the mounting locations 141-146 are positioned adjacent a backside of functional surface 124 along a top of functional surface 124. In this manner, light sources 151-156 are positioned in the mounting locations 141-146 facing downward to transmit light substantially downwardly for illuminating functional surface 124 and functional markings 126, 128 from above and behind. Alternative mounting locations may be employed such that the light sources are positioned behind, on one or both sides, and/or beneath functional surface 124 without departing from the scope hereof. In embodiments, functional surface 124 and functional markings 126, 128 may be fully or partially transparent to enable their illumination via the light sources, thereby providing a "backlit" hybrid lamp.

Hybrid lamp 120 may include greater or fewer than six light sources without departing from the scope hereof. Light sources 151-156 may be different types of light emitting devices, including but not limited to incandescent bulbs, halogen lamps, light-emitting diodes (LEDs), or other types of lights. In certain embodiments, light sources 151-156 are LEDs each mounted to a respective printed-circuit board (PCB), with each of the PCBs configured for mounting to the hybrid lamp 120 in one of the mounting locations 141-146. In embodiments, the LEDs consume low power to provide a low power hybrid lamp. In certain embodiments, each LED consumes less than one watt each. In some embodiments, each LED consumes about 0.5 watt each.

Figure 6:
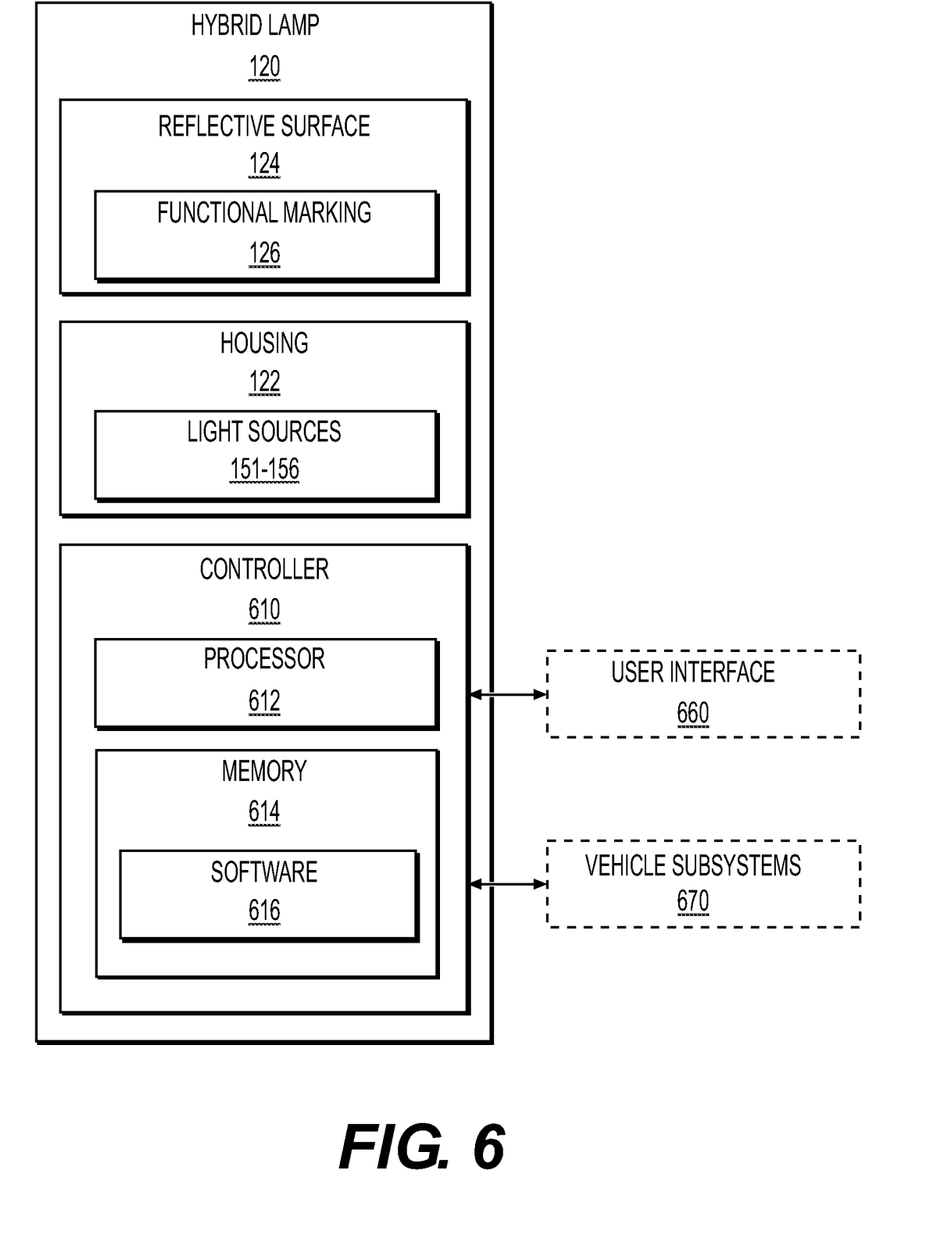
FIG. 6 is a block diagram of the hybrid lamp of FIG. 1 with a controller, in an embodiment.

FIG. 6 is a block diagram of hybrid lamp 120 including a controller 610 configured for individually turning each of light sources 151-156 on/off and for individually modulating an intensity of each light source (e.g., via pulse-width modulation). Controller 610 is, for example, a computer, microcontroller, microprocessor, or programmable logic controller (PLC), having a memory 614, including a non-transitory medium for storing software 616, and a processor 612 for executing instructions of software 616. In embodiments, software 616 is configured as firmware. In embodiments, each LED light source is mounted to a PCB having a dedicated microcontroller for controlling the respective LED. A plurality of microcontrollers may be communicatively coupled to a master controller (e.g., controller 610) for providing coordinated lighting effects by turning on/off or modulating each of the LEDs. Each of the plurality of LEDs may be configured to illuminate separate portions of hybrid lamp 120 (e.g., only functional surface 124, or one or both functional markings 126, 128). Controller 610 may be used to illuminate functional markings 126, 128 according to an automated or preprogrammed schedule, or optionally in response to input signals from vehicle subsystems 670 (e.g., to automatically illuminate functional markings 126, 128 when ambient lighting falls below a predetermined intensity as determined by signals from a light sensor/photodetector).

In embodiments, controller 610 may optionally be accessed via a user interface 660 that includes one or more of buttons and/or switches located in a vehicle cabin such that illumination of the functional markings 126, 128 may be controlled by a user. In some embodiments, user interface 660 includes a touch screen display device configured for receiving touch indications by the user. The touch screen display device may be located in the vehicle cabin and/or accessed remotely via a mobile device (e.g., smartphone, tablet, or computer). User interface 660 may be configured to present a menu for selecting illumination options for the functional markings 126, 128. For example, user interface 660 may be used to program controller 610 to illuminate functional markings 126, 128 according to a preprogrammed schedule or in response to input signals from vehicle subsystems 670.

Communication between user interface 660, controller 610, vehicle subsystems 670, and light sources 151-156 may be by a wired and/or wireless communication media. For example, controller 610 configured as the master controller may include a transmitter/receiver, a multi-channel input/output (I/O) data bus, or the like (not shown) for communicatively coupling with user interface 660 and the light source PCBs.

In operation, individual LEDs may be turned on/off or modulated to illuminate/dim separate portions of hybrid lamp 120. Specifically, functional surface 124 and functional markings 126, 128 may each be independently illuminated/dimmed via individual control of light sources 151-156 for independently contributing to tail-light and/or stop functions. For example, a tail-light function may be provided by fully illuminating both functional markings 126, 128 without illuminating functional surface 124, whereas a stop function may be provided by fully illuminating both functional markings 126, 128 and functional surface 124. Alternatively, the functional surface 124 may be partially illuminated (e.g., dimly lit) to provide a tail-light function and fully illuminated (e.g., brightly lit) to provide a stop function, while functional markings 126, 128 remain fully illuminated for both tail-light and stop functions. Other combinations of illumination between functional surface 124 and functional markings 126, 128 are possible and within the scope of the present disclosure.

In addition to automotive functions, hybrid lamp 120 may be used to provide other functions such as communication and messaging functions (e.g., a welcome function that illuminates functional markings 126, 128 when the vehicle is locked or unlocked). As described above, controller 610 may optionally be coupled communicatively with vehicle subsystems 670. This enables automatic illumination of functional markings 126, 128 via individually addressed light source(s) based upon, or related to, information provided by other subsystems of the vehicle. For example, functional markings 126, 128 may include a low fuel symbol and/or a low battery-charge symbol that is illuminated when controller 610 receives a signal from a fuel gauge and/or a battery charge meter onboard the vehicle. In an embodiment, when a user unlocks the vehicle doors (e.g., via a key fob), functional markings 126, 128 are illuminated to highlight a symbol, feature, or message of functional markings 126, 128 so as to remind the user to refuel or recharge the battery.

Features described above as well as those claimed below may be combined in various ways without departing from the scope hereof. The following examples illustrate some possible, non-limiting combinations:

(A1) A hybrid lamp for a vehicle includes a functional surface, a functional marking integrated within the functional surface, a plurality of light sources configured to illuminate the functional marking and the functional surface, a housing adapted to structurally support the plurality of light sources and the functional surface, and a controller configured to individually control each of the plurality of light sources for providing different illumination patterns of the functional marking and the functional surface such that automotive functional lighting and non-automotive functional lighting is provided.

(A2) For the hybrid lamp denoted as (A1), the functional surface and the functional marking may be integrated within an automotive vehicle lamp such that, when illuminated in a lit mode via the plurality of light sources, the functional surface and the functional marking contribute to photometric lighting levels needed for automotive functionality of a vehicle lamp.

(A3) For the hybrid lamp denoted as (A1) or (A2), the automotive vehicle lamp may be a tail-light and the functional marking may be configured to contribute to a stop signal when illuminated in the lit mode.

(A4) For the hybrid lamp denoted as any of (A1) through (A3), the automotive vehicle lamp may be a turn-signal light and the controller may be configured to intermittently illuminate the functional marking to provide to a blinking turn signal.

(A5) For the hybrid lamp denoted as any of (A1) through (A4), the functional surface may be a reflective surface that comprises a plurality of microlens surfaces.

(A6) For the hybrid lamp denoted as any of (A1) through (A5), the plurality of microlens surfaces may be patterned at different angles to create a textured appearance.

(A7) For the hybrid lamp denoted as any of (A1) through (A6), the functional surface and the functional marking may be configured to reflect light at predetermined angles, such that in an unlit mode, ambient light reflects off of the functional surface differently than the functional marking, thereby accentuating visibility of the functional marking.

(A8) For the hybrid lamp denoted as any of (A1) through (A7), the functional surface may include one or more of micro optics, prescription optics, a metalized coating, or an optical treatment configured to provide a contrasting appearance compared to the functional marking.

(A9) For the hybrid lamp denoted as any of (A1) through (A8), the functional marking may include one or more of a logo, design, emblem, symbol, geometric shape, graphic, text, or coded message.

(A10) For the hybrid lamp denoted as any of (A1) through (A9), the functional marking may provide an illuminated three-dimensional effect in a lit mode.

(A11) For the hybrid lamp denoted as any of (A1) through (A10), the functional marking may be embossed such that portions of the functional marking protrude in front of the functional surface.

(A12) For the hybrid lamp denoted as any of (A1) through (A11), the functional surface and the functional marking may include a single part formed of a plastic material using a single mold via a thermoforming process or an injection molding process.

(A13) For the hybrid lamp denoted as any of (A1) through (A12), the functional surface and the functional marking may be at least partially transparent enabling the hybrid lamp to be backlit.

(A14) For the hybrid lamp denoted as any of (A1) through (A13), the housing may be configured with a plurality of mounting locations configured for structurally supporting the plurality of light sources, respectively.

(A15) For the hybrid lamp denoted as any of (A1) through (A14), the plurality of mounting locations may be configured to align the plurality of light sources in a linear array. The linear array may be positioned above the functional surface such that the plurality of light sources are configured to project light downwardly onto the functional surface when illuminated in a lit mode.

(A16) For the hybrid lamp denoted as any of (A1) through (A15), the plurality of light sources may include a plurality of light-emitting diodes (LEDs), each of the plurality of LEDs being configured to consume less than one watt each.

(A17) For the hybrid lamp denoted as any of (A1) through (A16), each of the plurality of light sources may be mounted to one of a plurality of printed-circuit boards, respectively, and each printed-circuit board of the plurality may be communicatively coupled with the controller for individually modulating an intensity of each light source via pulse-width modulation.

(A18) For the hybrid lamp denoted as any of (A1) through (A17), wherein the controller may be configured to illuminate the functional marking according to an automated schedule in response to input signals from vehicle subsystems.

(A19) For the hybrid lamp denoted as any of (A1) through (A18), a user interface may be configured to receive a selection from a menu of options for illuminating the functional marking.

(B1) A hybrid vehicle lamp includes an opaque-metalized surface having a transparent marking. The transparent marking is integrated within the same piece of material as the opaque-metalized surface. A plurality of light sources are configured to illuminate the transparent marking and the opaque-metalized surface. A housing has a plurality of mounting locations configured to align the plurality of light sources for illumination of the opaque-metalized surface and the transparent marking in a lit mode. A controller is configured to individually control each of the plurality of light sources for providing different illumination patterns of the transparent marking and the opaque-metalized surface such that at least one automotive lighting function is provided. The opaque-metalized surface and the transparent marking are configured such that the transparent marking illuminates differently than the opaque-metalized surface, thereby accentuating visibility of the transparent marking to provide a decorative function.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Not all operations listed in the various figures need be carried out in the specific order described.

The invention claimed is:

1. A hybrid lamp for a vehicle, comprising:
    a functional surface with metallic portions having a front side exposed on an exterior of the hybrid lamp;
    a plurality of microlens surfaces disposed on the front side, wherein the plurality of microlens surfaces are patterned at different angles providing a textured appearance viewable from outside the vehicle;
    a functional marking embossed upon the front side of the functional surface, wherein the functional marking protrudes outwardly in front of the front side of the functional surface;
    a plurality of light sources configured to illuminate the functional marking and the functional surface in a lit mode;
    a housing adapted to structurally support the plurality of light sources and the functional surface; and
    a controller configured to individually control each of the plurality of light sources for providing different illumination patterns of the functional marking and the functional surface such that automotive functional lighting and non-automotive functional lighting is provided.

2. The hybrid lamp of claim 1, wherein the functional surface and the functional marking are integrated within an automotive vehicle lamp such that, when illuminated in the lit mode via the plurality of light sources, the functional surface and the functional marking contribute to photometric lighting levels needed for automotive functionality of a vehicle lamp.

3. The hybrid lamp of claim 2, wherein the automotive vehicle lamp is a tail-light and the functional marking is configured to contribute to a stop signal when illuminated in the lit mode.

4. The hybrid lamp of claim 2, wherein the automotive vehicle lamp is a turn-signal light and the controller is configured to intermittently illuminate the functional marking to provide to a blinking turn signal.

5. The hybrid lamp of claim 1, wherein the functional marking comprises one or more of a logo, design, emblem, symbol, geometric shape, graphic, text, or coded message.

6. The hybrid lamp of claim 1, wherein the functional surface and the functional marking comprise a single part formed of a plastic material using a single mold via a thermoforming process or an injection molding process.

7. The hybrid lamp of claim 1, wherein the plurality of light sources comprise a plurality of light-emitting diodes (LEDs), each of the plurality of LEDs being configured to consume less than one watt each.

8. They hybrid lamp of claim 1, wherein each of the plurality of light sources is mounted to one of a plurality of printed-circuit boards, respectively, and each printed-circuit board of the plurality is communicatively coupled with the controller for individually modulating an intensity of each light source via pulse-width modulation.

9. The hybrid lamp of claim 1, wherein the controller is configured to illuminate the functional marking according to an automated schedule in response to input signals from vehicle subsystems.

10. The hybrid lamp of claim 1, further comprising a user interface configured to receive a selection from a menu of options for illuminating the functional marking.

11. A hybrid lamp for a vehicle, comprising:
a reflective outer surface, wherein the reflective outer surface comprises an outwardly facing metalized surface having a metallic coating;
a functional marking integrated within the reflective outer surface;
a plurality of light sources configured to illuminate the functional marking and the reflective outer surface;
a housing adapted to structurally support the plurality of light sources and the reflective outer surface, wherein the housing is configured with a plurality of mounting locations configured for structurally supporting the plurality of light sources, respectively;
the plurality of mounting locations are positioned adjacent a backside of the reflective outer surface and above the reflective outer surface, such that the plurality of light sources are configured to provide backlit and top-lit lighting in a lit mode; and
a controller configured to individually control each of the plurality of light sources for providing different illumination patterns of the functional marking and the reflective outer surface such that automotive functional lighting and non-automotive functional lighting is provided.

12. The hybrid lamp of claim 11, wherein the plurality of mounting locations are configured to align the plurality of light sources in a linear array, the linear array being positioned above the reflective outer surface such that the plurality of light sources are configured to project light downwardly onto the reflective outer surface when illuminated in the lit mode.

13. The hybrid lamp of claim 11, wherein the reflective outer surface comprises an opaque-metalized surface and the functional marking comprises a transparent-metalized surface such that when backlit in the lit mode the functional marking is illuminated, and when in an unlit mode the functional marking reflects ambient light differently than the reflective outer surface.

14. A hybrid lamp for a vehicle, comprising:
a functional surface with metallic portions having a front side that faces outwardly;
a physical three-dimensional marking embossed upon the front side of the functional surface such that the three-dimensional marking protrudes outwardly from the front side;
a plurality of light sources configured to illuminate the functional surface and the physical three-dimensional marking in a lit mode;
a housing adapted to structurally support the plurality of light sources and the functional surface; and
a controller configured to individually control each of the plurality of light sources for providing different illumination patterns of the functional surface and the physical three-dimensional marking such that automotive functional lighting and non-automotive functional lighting is provided.

15. The hybrid lamp of claim 14, wherein the physical three-dimensional marking comprises a physical protrusion that projects outwardly in front of the front side of the functional surface, such that in a lit mode the physical three-dimensional marking provides an illuminated three-dimensional protrusion.

16. The hybrid lamp of claim 14, wherein the plurality of light sources may be controlled by a user from a user interface located within a cabin of the vehicle.

17. The hybrid lamp of claim 14, further comprising a plurality of mounting locations disposed above the front side, wherein the mounting locations are configured to align the plurality of light sources in a linear array such that the plurality of light sources are configured to project light downwardly onto the front side of the functional surface.

18. The hybrid lamp of claim 14, wherein each of the plurality of light sources is mounted to one of a plurality of printed-circuit boards, respectively, and each printed-circuit board of the plurality is communicatively coupled with the controller for individually modulating an intensity of each light source via pulse-width modulation.

19. The hybrid lamp of claim 14, wherein the front side of the functional surface comprises one or more of micro optics, prescription optics, a metalized coating, or an optical treatment configured to provide a contrasting reflectiveness compared to the three-dimensional marking.

* * * * *

UNITED STATES PATENT AND TRADEMARK OFFICE
CERTIFICATE OF CORRECTION

PATENT NO. : 11,629,839 B2
APPLICATION NO. : 17/212671
DATED : April 18, 2023
INVENTOR(S) : Lester Ray Sullivan et al.

Page 1 of 1

It is certified that error appears in the above-identified patent and that said Letters Patent is hereby corrected as shown below:

In the Claims

Column 11, Line 1: "They" should be replaced with --The--.

Signed and Sealed this
Twenty-sixth Day of December, 2023

Katherine Kelly Vidal
*Director of the United States Patent and Trademark Office*